Figure 1:
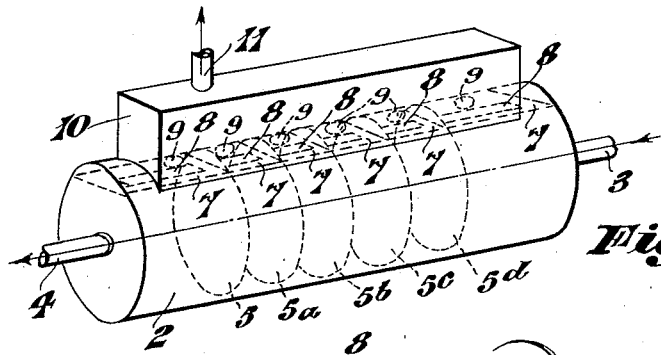

Nov. 6, 1928. 1,690,537
H. S. HELE-SHAW ET AL
SEPARATION OF LIQUIDS
Filed July 19, 1926  2 Sheets-Sheet 1

Nov. 6, 1928.  1,690,537

H. S. HELE-SHAW ET AL

SEPARATION OF LIQUIDS

Filed July 19, 1926  2 Sheets-Sheet 2

Inventors
Henry Selby Hele-Shaw
and
Albert Beale
By B. Singer, atty.

Patented Nov. 6, 1928.

1,690,537

UNITED STATES PATENT OFFICE.

HENRY SELBY HELE-SHAW AND ALBERT BEALE, OF LONDON, ENGLAND.

SEPARATION OF LIQUIDS.

Application filed July 19, 1926, Serial No. 123,449, and in Great Britain July 22, 1925.

The present invention relates to means for separating liquids differing more especially in the physical properties of specific gravity and viscosity, such process being effected heretofore by apparatus wherein a liquid from which oil is to be separated is caused to flow below the mouths of a series of vertical collecting chambers leading to a common collecting vessel, steam heating coils being provided to reduce the viscosity of the oil.

In particular the invention is applicable to the treatment of oily bilge-water and ballast-water in oil-burning vessels, with the object of recovering the oil and discharging uncontaminated water; but it is to be understood to be applicable to the separation of any liquids differing in specific gravity and viscosity.

In respect of the utilization of differences of specific gravity to effect separation it has been realized fairly generally that it is important to provide for a region of slow, quiet flow in which the oil can rise through the water; and, to a less extent, that the separation is best effected when the oil can rise normally to the flow of water, so as not to be impeded thereby, and that in consequence of the desirability of avoiding undue changes in the direction of the flow, such as lead to excessive eddying, the flow of the water is necessarily best arranged to be substantially in a horizontal direction.

The present invention comprises a method of and apparatus for separating liquids wherein and whereby the liquid to be treated is caused to flow beneath and in contact with a horizontal or substantially horizontal plate or member or series of such members forming the upper surfaces of one or more straight channels or series of channels each provided with a number of perforations or passages distributed over the surface and leading to a collecting pipe or reservoir.

The function of the pierced horizontal plate is to allow the oil which rises out of the flow to pass through the pierced plate into a quiet upper region, shielded from the water flow. The partitions above being continuous up to the tank top, there is no possibility of the oil flowing lengthwise above the horizontal plate and descending at the end into the water flow, and so into the water discharge.

If the passages from the separator proper were large and free, there would be the possibility of a flow of water being established through the oil receiver, and so back to the water outlet, and this would negative the special advantages of the arrangement. Hence the restriction of these passages by the use of the horizontal pierced plate and the smallest reasonable pipes between the separator proper and the oil collecting vessel.

The apparatus may also be provided with separating means utilizing the differences of viscosity in the liquids to be separated. This may be effected in the case of oil separation by providing at suitable intervals in the main channel below the oil collecting perforations or passages, downwardly extending interceptors of wire mesh or perforated plates designed to allow the liquid under treatment to pass through them without materially obstructing the flow, so as to offer surfaces on which the more viscous liquid will to some extent collect and which upon acquiring further small globules from the flowing liquid will coalesce and so the more readily float to the top of the liquid and through the oil collecting channels or perforations. When the collecting channels are formed by a series of vertical plates these depending collecting devices may extend downwards from the lower edges of such plates.

A necessary fitting will comprise an air vent for relieving the separator of such air as may be pumped. This may take the form of pipes led away to a suitable height, or of a small float-controlled valve. Drain-cocks will also be fitted, and heating coils for reducing the viscosity of the oil when necessary.

This invention also includes the application of apparatus substantially identical with that described, but inverted, for dealing with mixtures in which the lighter liquids preponderates.

The perforations in the horizontal member may be formed in the upper surfaces of a number of parallel pipes of such dimensions as to ensure a flow through them of the desired velocity without eddy currents.

Air vents, drain cocks and heating coils for reducing the viscosity of the oil when necessary, may be provided, and the internal parts of the apparatus may be made removable for facility in cleaning.

Devices in which flow takes place between flat plates will clearly be of an order equivalent to that for a corresponding system of pipes laid side by side. The use of flat plates arranged close together instead of a large number of circular pipes is therefore proposed as means for ensuring a stream-line flow, which may prove cheaper in construction although identical in principle. For instance the flat plates may be arranged horizontally between plates corresponding to the tube plates of the tubular construction each alternate plate being perforated, and the space below each perforated plate having an inlet in one tube plate for the mixture and an outlet in the other tube plate for the separated water, all the plates being inclined laterally and extending from one wall of the casing up to a wall at the opposite side of the casing formed on a vertical passage leading up to the oil reservoir, such wall being provided with perforations opening into the spaces above the perforated plates.

Figure 2:
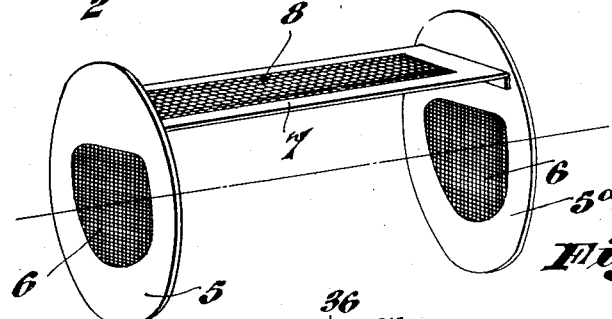
Figure 4:
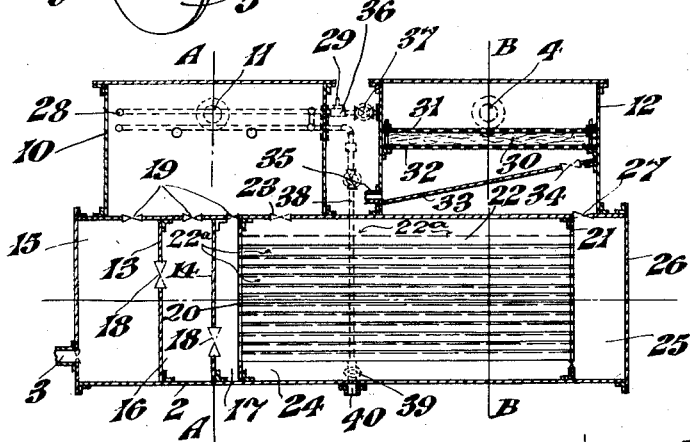
Figure 3:
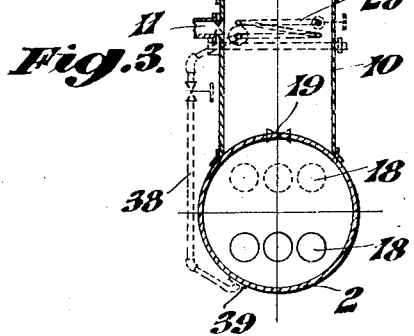
Figure 5:
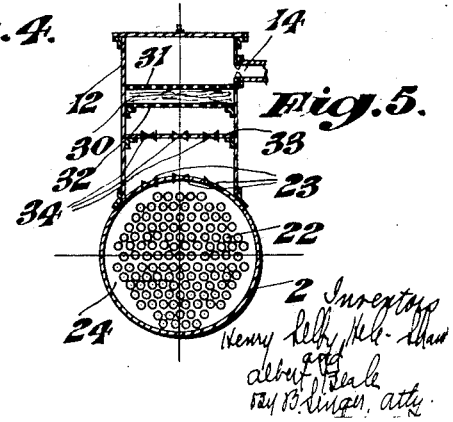
Figure 6:
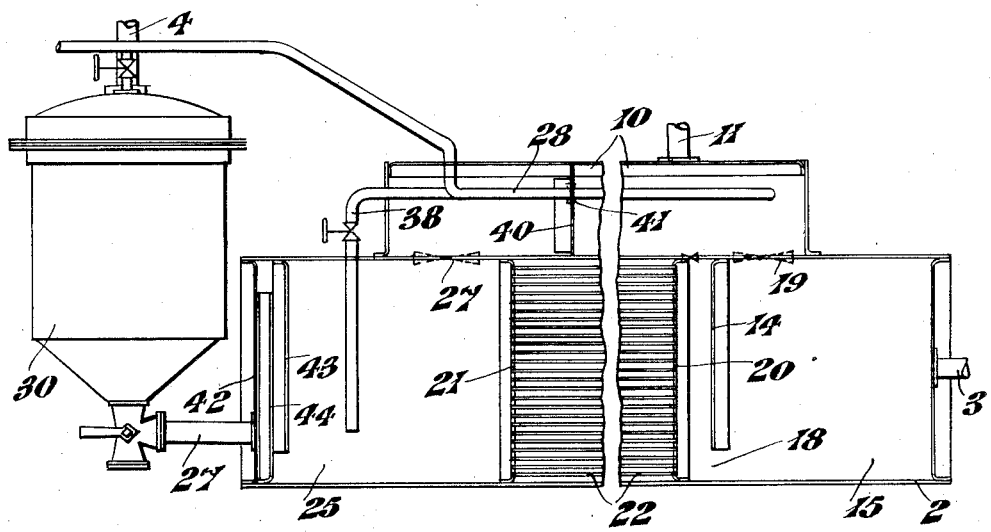
Figure 7:
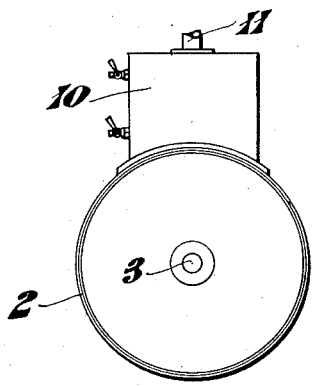

Various embodiments of the invention for the treatment of oily water are illustrated by the accompanying drawings more or less diagrammatically, wherein Fig. 1 is a perspective view of a simple form of apparatus, Fig. 2 being a detail of Figure 1 on an enlarged scale, Figures 3, 4 and 5 illustrate end and longitudinal sections of a modified construction of the apparatus, Figure 3 being a section on line A—A, Figure 4 and Fig. 5 a section on line B—B Figure 4, and Figures 6 and 7 illustrate a partly sectional elevation and end view of a further modification of the apparatus.

In Figures 1 and 2, a cylindrical vessel 2 is provided with an inlet 3 for the oily water to be treated, and an outlet 4 for the separated water. The diaphragms 5, $5^a$, $5^b$ and $5^c$ are held together at the proper distance apart by the horizontal plates 7. This holds them in position in the cylinder 2. Said diaphragms may be a nice fit, since they are subjected only to the pressure incident to stream flow, which obviously is not great. They are shown in the drawings as being fixed by being made a tight fit. From the top of the vessel 2 and extending right across this portion of the vessel are fixed horizontal plates 7 provided with an opening covered by wire gauze 8. A hole 9 is provided in the top of the vessel 2 between each of the diaphragms 5, $5^a$ etc and these holes open out into an oil collecting vessel 10 provided with an outlet 11 and secured to the top of the vessel 2.

During the operation of the apparatus the oily water passing in the vessel 2 through the inlet 3 fills all the divisions therein and oil collecting on the vertical gauze sheets 6 accumulates and coalesces and by virtue of its bulk readily rises up through the horizontal gauze sheets 8 and is discharged through the outlet 11, together with that rising directly from the water through the gauze sheets 8 without adhering to the vertical gauze sheets 6.

This apparatus may be provided with heating pipes or coils.

In the apparatus illustrated by Figures 3, 4 and 5 the cylindrical vessel 2 is provided with an oily water inlet 3 an outlet 4 for the separated water and an oil outlet 11 as in the previous example.

The vessel 2 has two separate rectangular chambers 10 and 12 fixed on its upper portion. The first portion of the vessel 2 is divided by two baffle plates 13 and 14 and a tube plate 20 into three compartments 15, 16 and 17 placed in communication with one another by means of holes 18 in the baffle plates. Each of the compartments 15, 16 and 17 communicate with the oil chamber 10 by means of holes 19 in the top of the vessel 2. Between the tube plate 20 and a corresponding tube plate 21 are fixed a number of parallel tubes 22. In the upper surface of each of the tubes holes $22^a$ are drilled at intervals along their length, these holes preferably increasing in number and decreasing in size toward their outlet ends. Three holes 23 leading into the chamber 10 from the tube compartment 24 are provided in the top of the vessel 2. The compartment 25 between the tube plate 21 and end 26 of the vessel 2 is provided at the top with an outlet 27 leading to the water chamber 12.

The oil chamber 10 is provided with a steam coil or pipe 28 connected to a steam supply pipe 29 for use in reducing the viscosity of heavy oils to enable them to flow readily. The water chamber 12 is provided with a filter bed 30 fixed between perforated plates 31 and 32. Extending right across the chamber 12 and below the filter is fixed an inclined plate 33 provided at its upper portion with a hole 34. Above the lower end of the inclined plate 33 is provided an outlet 35, and the steam supply pipe 29 is provided with an extension 36 fitted with a valve 37 and opening into the water chamber 12. The steam coil 28 can be connected by means of a pipe 38 with an inlet 39 in the tube compartment 24 the tube compartment 24 being also provided with a cleansing outlet 40.

The oily water under treatment passing through the inlet 3 enters the compartment 15 when the most readily separated oil rises through the opening 19 into the oil chamber 10, the oily water then passes through the opening 18 in the baffle plate 13, when a further quantity of the oil separates and rises through the second opening 19 into the oil chamber 10, the oily water from the compartment 16 passes through the second opening 18 into the compartment 17 where further oil separates and rises up through the third opening 19 into the oil chamber 10. The oily water from the compartment 17 passes through the tubes 22 into the compartment 25 and during its passage through these tubes oil escapes through the perforations in the upper surfaces of the tubes and rises up through the openings 23 into the oil chamber 10. The water from the tubes 10 may still contain a minute quantity of oil and this is arrested by the filter 30 through which the water passes upwards after passing through the openings 27 and 34. The oil may be afterwards removed from the filter 30 by means of steam admitted through the valve 37 such oil being discharged through the outlet 35.

In the third modification of the apparatus illustrated by Figures 6 and 7 the corresponding parts are given the same numerals as in Figures 3, 4 and 5. In this modification there is only one baffle plate 14 between the oily water inlet 3 and the tube plate 20 the opening 18 in the baffle plate being at its lowest portion. The oil chamber 10 is divided into two portions by a baffle 40 provided with a communicating opening 41. The compartment between the tube plate 21 and the end 42 of the vessel 2 is provided with downwardly and upwardly extending baffle plates 43 and 44 and the filter 30 is separate from the vessel 2, the outlet 4 therefrom for the water being arranged at its top.

The steam heating pipe 28 extends the full length of the oil chamber 10 as in the previous example.

The operation is similar to that described with reference to the previous example, the oily water entering the apparatus passes through the inlet 3 to a chamber 15 provided at its top with an outlet 19 through which separated oil passes to the oil chamber 10, the oily water then passes through the opening 18 in the baffle 14 and then through the tubes 22 into the chamber 25, the oil coagulated by passing through the tubes 22 readily rises through the opening 27 into the division of the oil chamber 10 on the left of the baffle plate 40 from which the oil passes through the opening 41 to the oil delivery outlet 11. The water from the compartment 25 passes under the baffle 43 and above the baffle 44 to the outlet 27 leading to the filter 30 in which it is treated as in the previous example. The steam pipe 38 from the heating pipe 28 enters the compartment 25 instead of the space around the tubes 22, the final separation of the oil instead of taking place in such space takes place in the compartment 25.

The invention has been made applicable to a closed system, as distinct from open-topped tanks, because a closed system is advantageous in ship-work, both from the fact that it may be arranged in any position relative to the water-line, and from the fact that its operation is unaffected by rolling in a seaway.

What we claim and desire to secure by Letters Patent is:—

1. Apparatus for separating mixed liquids of different specific gravities, comprising a vessel perforated along its top portion and having a series of perforated vertical partitions transversely arranged therein and through which the liquid mixture is caused to flow, and a collecting chamber for receiving the lighter constituent of the liquid mixture, the top perforations in the vessel being arranged to open into the collecting chamber and the vertical partitions arranged between the top perforations, the vessel being provided at one end with an inlet for the liquid mixture and an outlet at the opposite end for the heavier constituent of the mixture.

2. Apparatus for separating mixed liquids of different specific gravities, comprising a vessel having a series of parallel tubes arranged between tube plates extending across the vessel and through which the liquid is caused to flow, a collecting chamber for the lighter constituents of the liquid mixture, the upper surfaces of the tubes being provided with perforations through which the lighter constituents pass to the collecting chamber through a perforation in the vessel between the tube plates and opening into the collecting chamber, the vessel being provided with an outlet for the heavier constituents of the liquid mixture and an inlet for the mixed liquid.

3. Apparatus for separating mixed liquids of different specific gravities, comprising a horizontal vessel perforated at the top and having at one end an inlet for the mixture, two collecting chambers one for the lighter and the other for heavier separated constituents of the liquid mixture, the vessel being provided with a series of perforated vertical partitions transversely arranged therein and through which the liquid mixture is caused to flow, the top perforations being arranged between the vertical partitions, and with those at the inlet end of the vessel opening into the collecting chamber for the lighter separated constituents, while at the other end a top perforation forms an inlet to the collecting chamber for the heavier constituents of the mixture.

4. Apparatus for separating mixed liquids of different specific gravities, comprising a horizontal vessel perforated at the top and having at one end an inlet for the mixture, a filter, two collecting chambers one for the lighter and the other for heavier separated constituents of the liquid mixture, the vessel being provided with a series of perforated vertical partitions transversely arranged therein and through which the liquid mixture is caused to flow, the top perforations being arranged between the vertical partitions, and with those at the inlet end of the vessel opening into the collecting chamber for the lighter separated constituents while at the other end a top perforation forms an inlet to the collecting chamber for the heavier constituents of the mixture, the filter being arranged between the inlet of the collecting chamber for the heavier separated constituents of the liquid mixture and an outlet provided on such chamber.

5. Apparatus for separating oil from a mixture of oil and water, comprising a horizontal vessel perforated at the top and having at one end an inlet for the mixed oil and water, a filter, two collecting chambers one for the separated oil and the other for the separated water, the vessel being provided with a series of perforated partitions vertically and transversely arranged therein and through which the mixture of oil and water is caused to flow, the top perforations being arranged between the vertical partitions, and with those at the inlet end of the vessel opening into the collecting chamber for the separated oil while at the other end a top perforation forms an inlet to the collecting chamber for the separated water, the said chamber being also provided with means for removing any oil collected in the filter.

6. Apparatus for separating oil from a mixture of oil and water, comprising a steam supply connection, a horizontal vessel perforated at the top and having at one end an inlet for the mixed oil and water, a filter, two collecting chambers one for the separated oil and the other for the separated water, the vessel being provided with a series of perforated partitions vertically and transversely arranged therein and through which the mixture of oil and water is caused to flow, the top perforations being arranged between the vertical partitions, and with those at the inlet end of the vessel opening into the collecting chamber for the separated oil while at the other end a top perforation forms an inlet to the collecting chamber for the separated water, the said chamber being also provided with means for admitting the supply of steam above the filter and for collecting and draining away any oil removed from the filter by the steam.

7. Apparatus for separating oil from water, comprising a horizontal vessel perforated at the top and having at one end an inlet for the mixed oil and water, a filter, two collecting chambers one for the separated oil and the other for the water, the vessel being provided with a series of perforated partitions vertically and transversely arranged therein and through which the mixture of oil and water is caused to flow, the top perforations being arranged between the vertical partitions, and those at the inlet end of the vessel opening into the collecting chamber for the separated oil while at the other end a top perforation forms an inlet to the collecting chamber for the separated water, the oil collecting chamber being provided with means for heating it.

In witness whereof we affix our signatures.

HENRY SELBY HELE-SHAW.
ALBERT BEALE.